United States Patent [19]

Tokura

[11] Patent Number: 5,687,473
[45] Date of Patent: Nov. 18, 1997

[54] APPARATUS AND METHOD FOR MOUNTING A HAIRPIN TUBE TO A HEAT EXCHANGER

[75] Inventor: Kenji Tokura, Osaka, Japan

[73] Assignee: Kyoshin Kogyo Co., Ltd., Osaka, Japan

[21] Appl. No.: 523,618

[22] Filed: Sep. 5, 1995

[30] Foreign Application Priority Data

Oct. 5, 1994 [JP] Japan ................................. 6-241454
Mar. 8, 1995 [JP] Japan ................................. 7-048658

[51] Int. Cl.$^6$ .................................................. B23P 15/26
[52] U.S. Cl. ....................... 29/727; 29/726.5; 29/890.043
[58] Field of Search ........................ 29/726.5, 726, 29/727, 463, 890.044, 890.043, 831

[56] References Cited

U.S. PATENT DOCUMENTS

| | | | |
|---|---|---|---|
| 3,935,951 | 2/1976 | Claus et al. | 29/726.5 |
| 4,543,711 | 10/1985 | Wada et al. | 29/726.5 |
| 4,683,649 | 8/1987 | Sbalchiero et al. | 29/726 |
| 4,734,969 | 4/1988 | Currier et al. | 29/726 |
| 5,099,677 | 3/1992 | Tokura | 29/727 |
| 5,228,191 | 7/1993 | Casterline | 29/726 |
| 5,442,853 | 8/1995 | Vetter | 29/727 |

*Primary Examiner*—Irene Cuda
*Attorney, Agent, or Firm*—Nikaido, Marmelstein, Murray & Oram LLP

[57] ABSTRACT

A method for mounting a hairpin tube to a heat exchanger body where a rod member is inserted into at least one of plural through holes defined in each of plural radiation fins stacked in the heat exchanger body. The rod member is further extended through the associated through holes of the stacked radiation fins. The hairpin tube is then inserted into the corresponding through holes.

12 Claims, 10 Drawing Sheets

APPARATUS AND METHOD FOR MOUNTING A HAIRPIN TUBE TO A HEAT EXCHANGER

BACKGROUND OF THE INVENTION

This invention relates to an apparatus and method for automatically inserting a hairpin tube into through holes of radiation fins which are stacked to produce a heat exchanger.

Referring to FIG. 10, a plurality of radiation fins 19, which make up a part of a heat exchanger 16, each include through holes 18 formed in a predetermined pattern for receiving hairpin tubes 17 which are later expanded. The fins are stacked in a framework 20 such that the through holes 18 of each radiation fin registery with the associated through holes 18 of the adjacent radiation fin. The hairpin tubes 17 are manually inserted first into the through holes 18 of the radiation fin 19a positioned closer to one end of the heat exchanger 16, and then manually pushed in until the tube extends to the radiation fin 19b positioned closer to the opposite end of the heat exchanger 16.

However, there is a problem associated with this conventional insertion manner of a hairpin tube. That is, the pattern of the through holes 18 is usually changed in accordance with the types of the heat exchanger. Accordingly, in case of that the hairpin tubes 17 are manually inserted into the associated through holes 18 of the stacked radiation fins 19a which are formed in a different pattern, it is required that the associated through holes 18 of the stacked radiation fins 19 are exactly aligned with each other to enable the maker to simultaneously and easily insert the hairpin tubes thereinto. However, it is very difficult to form the through holes 18 in such a highly precise manner, using a pressing machine, turning machine or the like.

Accordingly, it is difficult to stack the radiation fins 19 in the framework in such a manner as to exactly align the associated through holes 18. This may cause hesitation in the prompt insertion of the hairpin tubes 17 into the associated through holes 18 of the stacked radiation fins 19, and may invite a serious problem, such as the lowering of productivity of the heat exchanger.

OBJECT AND SUMMARY OF THE INVENTION

Therefore, it is an object of the present invention to provide a method and apparatus for easily and instantly insert the hairpin tube into the through holes of the radiation fins which make up the heat exchanger.

In accordance with the present invention, there is provided a method for mounting a hairpin tube to a heat exchanger body. A rod member is inserted into at least one of plural through holes defined in each of plural radiation fins stacked in the heat exchanger body. The rod member is further extended through the associated through holes of the stacked radiation fins. Then, the hairpin tube is inserted into the corresponding through holes.

There is further provided an apparatus for mounting a hairpin tube to a heat exchanger body. The apparatus includes a reciprocating member which is movable forward and backward. A rod member is mounted to the reciprocating member in such a manner as to be inserted into at least one of plural through holes defined in each of the radiation fins closer to one end of the heat exchanger body, and extend to the radiation fin closer to the opposite end of the heat exchanger body. A hairpin tube transporting member for transporting the hairpin tube is provided such that an open end of the hairpin tube is inserted from the through hole of the radiation fin closer to the opposite end of the heat exchanger body.

In accordance with the above method, all of the associated through holes of the stacked radiation fins can be aligned with each other, prior to inserting the hairpin tube into the associated through holes. Therefore, it is not necessary to previously abut the opposite open ends of the hairpin tube against the through holes of each of each radiation fin, and thus easy and instant insertion of the hairpin tube can be achieved.

Further, in accordance with the above apparatus, it is possible to instantly align the associated through holes of the stacked radiation fins with each other by inserting the rod member into the associated through holes from the through hole of the radiation fin closer to one end of the heat exchanger and extending the same to the opposite end of the heat exchanger, via the reciprocating member. Therefore, the hairpin tube can be easily inserted into the heat exchanger body, after the rod member is moved backward to be removed from the through holes.

BRIEF DESCRIPTION OF THE DRAWINGS

The above, and other objects, features and advantages of the present invention will become apparent from the detailed description thereof read in conjunction with the accompanying drawings wherein.

DETAILED DESCRIPTION OF THE PREFERRED EMBODIMENTS

Figure 1:
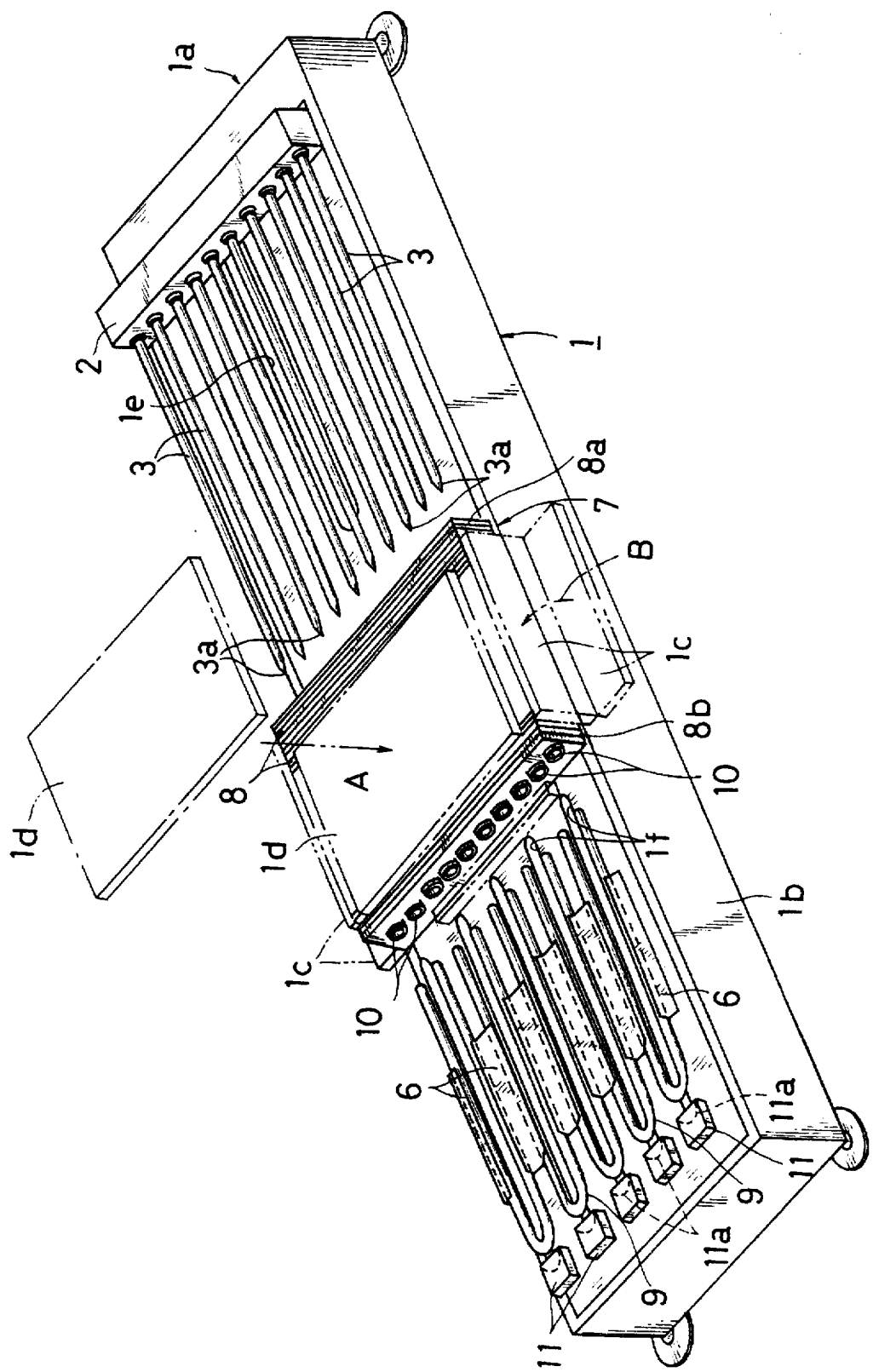
FIG. 1 is a perspective view illustrating an apparatus in accordance with an embodiment of the present invention.

Referring to FIG. 1, a hairpin tube inserting apparatus 1 includes a body 1a, which in turn includes a base 1b and holding members 1c and 1d. A heat exchanger body 7, as a workpiece, includes a plurality of radiation fins 8, each of which includes a plurality of through holes 10 formed in a predetermined pattern. A plurality of radiation fins 8 are stacked in the heat exchanger body 7 such that the associated through holes 10 are aligned with each other, and fixed to the body 1a of the hairpin tube inserting apparatus 1 by the holding members 1c and 1d.

A plurality of rod members 3 respectively have pointed tip ends 3a and are mounted on reciprocating member 2 such that the pointed tip ends 3a are directed at the respective through holes 10 of the radiation fin 8a closer to one end of the heat exchanger body 7.

The reciprocating member 2 is movable forward and backward along a first guiding groove 1e such that the rod members 3 can be removably inserted into the through holes 10 of the radiation fin 8a closer to the one end of the heat exchanger body 7 and can be extended to and through the radiation fin 8b closer to the opposite end of the heat exchanger body 7.

A plurality of hairpin tube holding members 6 respectively and slidably hold a plurality of hairpin tubes 9 to direct the hairpin tubes 9 towards the respective through holes 10 of the radiation fin 8b closer to the opposite end of the heat exchanger body 7 which has been fixed to the inserting apparatus body 1 by the holding members 1c and 1d.

A plurality of hairpin tube transporting members 11 are mounted to the apparatus body 1a and are movable forward and backward relative to the through holes 10 of the radiation fins 8b along at least one second guiding groove if for the inserting of the hairpin tubes 9 into the through holes 10 via hairpin tube receiving recesses which are respectively formed in the transporting members 11 for receiving a U-shaped bending portion of each of the hairpin tubes 9.

The description of an operation to mount the hairpin tubes 9 to the heat exchanger body 7 with the apparatus 1 of the above arrangement will be made hereinafter.

Figure 2A:
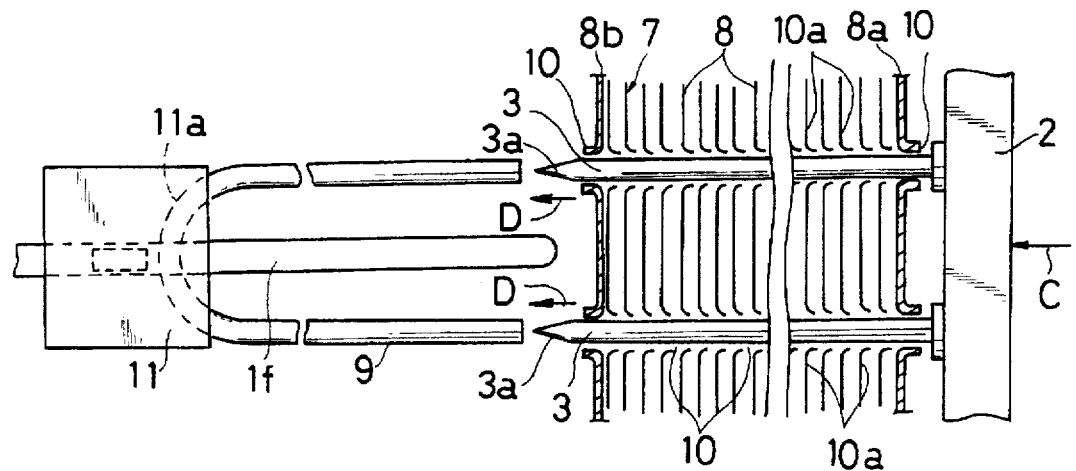
FIGS. 2A, 2B and 2C are schematic plan views illustrating operational steps of assembling an essential portion of the heat exchanger in accordance with one embodiment of the method of the present invention.

Referring to FIG. 2A, the reciprocating member 2, which is mounted on the apparatus body 1a, is moved forward in the direction of arrow C along the first guiding member 1e towards the heat exchanger body 7. The rod members 3 mounted on the reciprocating member 2 are inserted into the respective through holes 10 of the stacked radiation fins 8. The rod members 3 then extend through the associated through holes 10 and protrude outwardly away from the through holes 10 of the radiation fin 8b closer to the opposite end of the heat exchanger in the direction of arrows D, as the rod members 3 easily and instantly align the associated through holes 10 with each other via the pointed tip ends 3a.

Figure 2B:
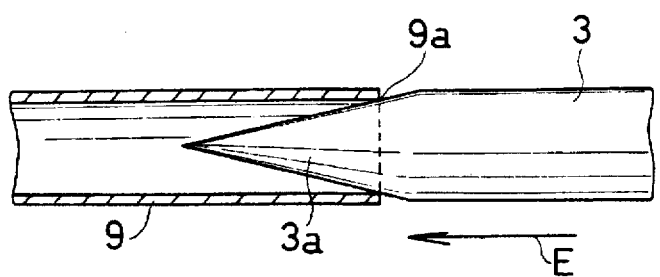

Then, each rod member 3 protruded away from the through hole 10 is inserted into a corresponding open end 9a of the hairpin tube 9 directed to the respective through hole 10 of the radiation fin 8b closer to the opposite end of the heat exchanger body 7, in the direction of arrow E, and a periphery of the tip end 3a of each rod member 3 subsequently abuts against an opening periphery of the respective open end 9a, as illustrated in FIG. 2B.

Figure 2C:
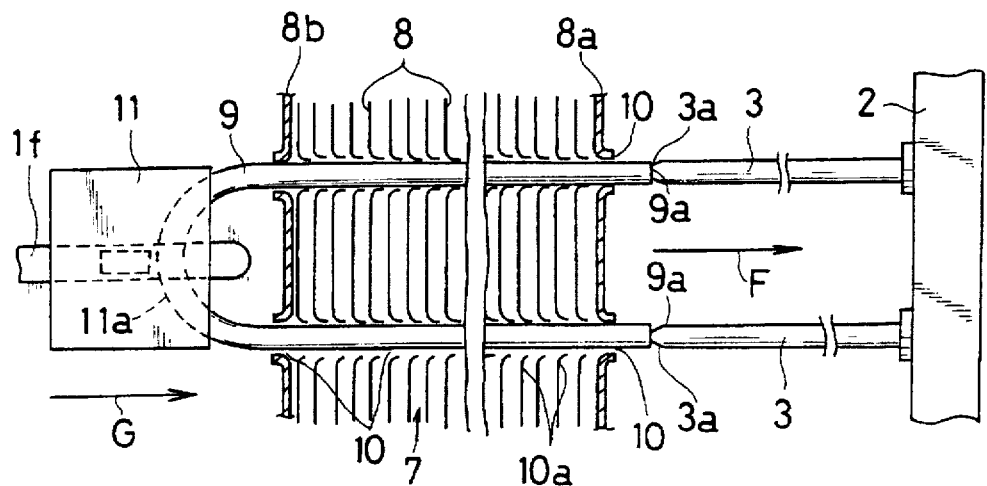

The reciprocating member 2 is then moved backward from the heat exchanger body 7 in the direction of arrow F, as the hairpin tube transporting member 11 is moved in the direction of arrow G synchronously with the reciprocating member 2 such that the abutment between the tip end 3a of the rod member 3 and the open end 9a of the hairpin tube 9 is maintained during the insertion of the hairpin tubes 9 into the through holes 10, as illustrated in FIG. 2C. With this operation, the associated through holes 10 of the stacked radiation fins 8 can be instantly aligned with each other, and the open ends 9a of the hairpin tubes 9 can be smoothly inserted into the heat exchanger body 7 without requiring manual labor, while preventing the open ends 9a from abutting against any non-through hole portions 10a of the radiation fins 8. Thus, the hairpin tube 9 can be completely and automatically inserted into the through holes 10.

In this embodiment, the hairpin tube transporting member 11 is moved synchronously with the reciprocating member 2 to maintain the abutting state between the open end 9a of the hairpin tube 9 and the tip end 3a of the rod member 3. However, it is not necessary that both members 11 and 2 are moved synchronously with one another. That is, after the associated through holes 10 of the radiation fins are aligned with each other via the rod members 3, the rod members 3 may be first moved backward and removed from the through holes 10, and subsequently the hairpin tubes 9 may be independently inserted into the through holes 10 via the hairpin tube transporting member 11.

Figure 3A:
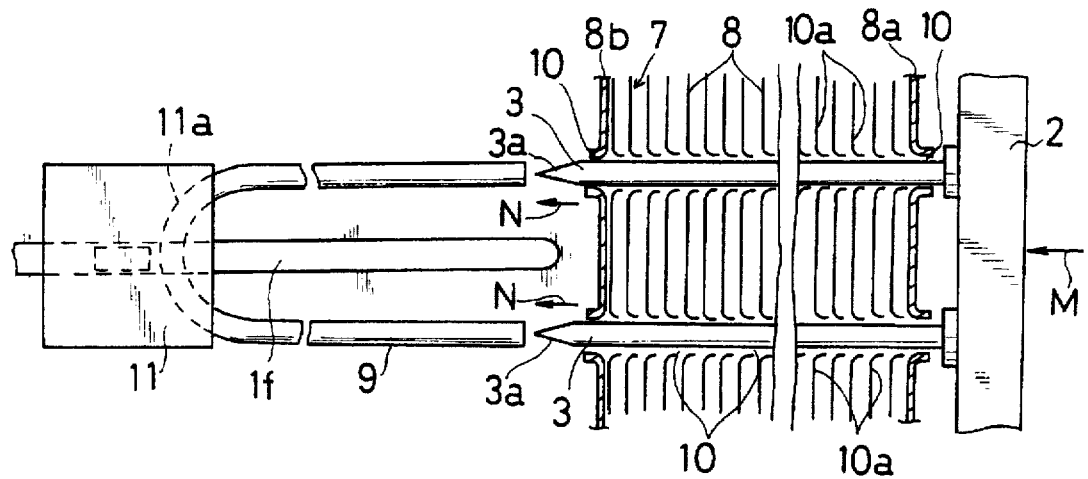
FIGS. 3A, 3B and 3C are schematic plan views illustrating operational steps of assembling an essential portion of the heat exchanger in accordance with another embodiment of the method of the present invention.
Figure 3B:
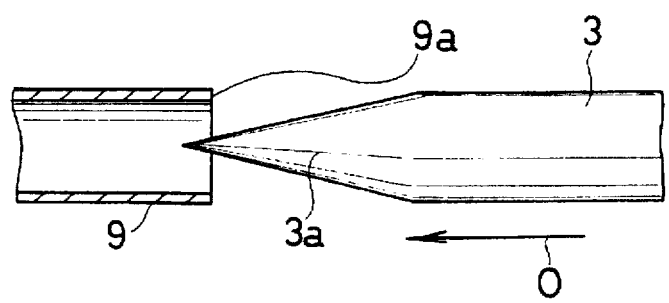
Figure 3C:
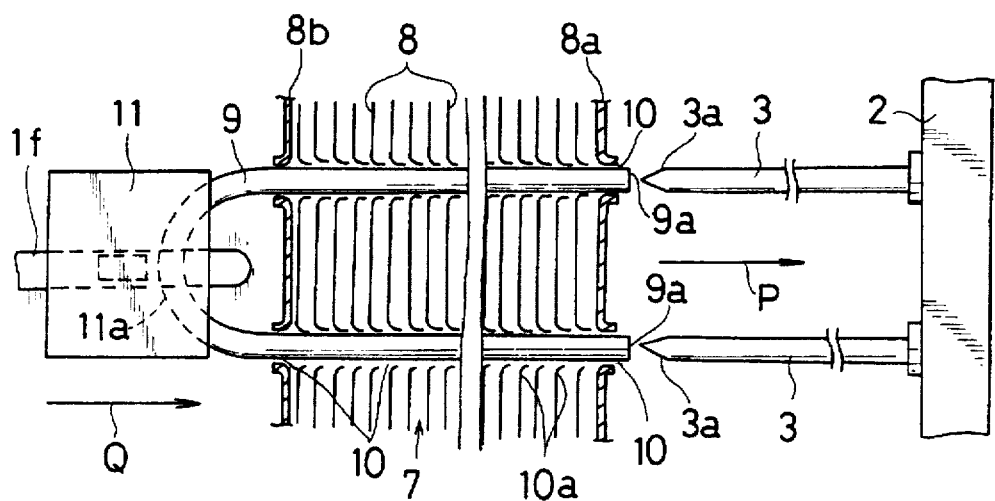

Referring to FIG. 3A, the reciprocating member 2 is moved forward towards the heat exchanger body 7 in the direction of arrow M such that the associated through holes 10 are easily and instantly aligned with each other via the pointed tip end 3a of the rod member 3. The pointed tip end 3a of the rod member 3, which protrudes away from the through hole 10 of the radiation fin 8b closer to the opposite end of the heat exchanger then is inserted into the open end 9a of the hairpin tube 9 as illustrated in FIG. 3B, or moved closer to the respective open ends 9a. In both cases, the periphery of the tip end 3a of the rod member 3 does not abut against the opening periphery of the open end 9a of the hairpin tube 9. The hairpin tubes 9 then are inserted into the heat exchanger body 7 by moving the hairpin tube transporting member 11 forward in the direction of arrow Q, as the reciprocating member 2 is moved away from the heat exchanger body 7 in the direction of arrow P, as illustrated in FIG. 3C. In this stage, the moving speed of the hairpin tube transporting member 11 may be the same as, or different from that of the reciprocating member 2.

In the above embodiments, the rod members 3 are inserted into all of the through holes 10, into which the hairpin tubes 9 are to be inserted, prior to inserting the hairpin tubes 9 into the through holes 10. However, the rod members 3 may be inserted into only some of the through holes 10 of the radiation fin 8a closer to the one end of the heat exchanger. In this case, when the rod members 3 are removed from the heat exchanger body 7, the hairpin tubes 9 may be inserted into all of the through holes 10 including the through holes, into which the rod members 3 are not inserted. That is, it is not necessary to prepare the same number of the rod members 3 as the number of the through holes 10 of each radiation fin 9, since all of the through holes 10 can be aligned with each other by inserting the rod members 3 into only some of the through holes 10 of each radiation fin 9. Then, the hairpin tubes 9 positioned at the opposite end of the heat exchanger body 7 can be inserted into all of the through holes 10 of the radiation fin 8b.

Figure 4A:
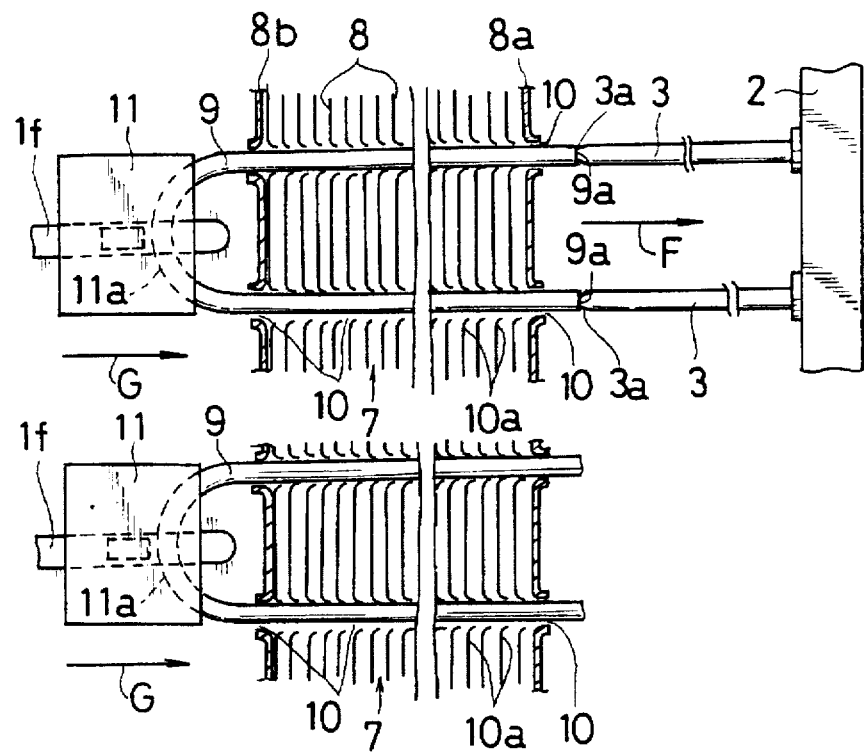
FIGS. 4A and 4B are schematic plan views illustrating operational steps of assembling an essential portion of the heat exchanger in accordance with a further embodiment of the method of the present invention.
Figure 4B:
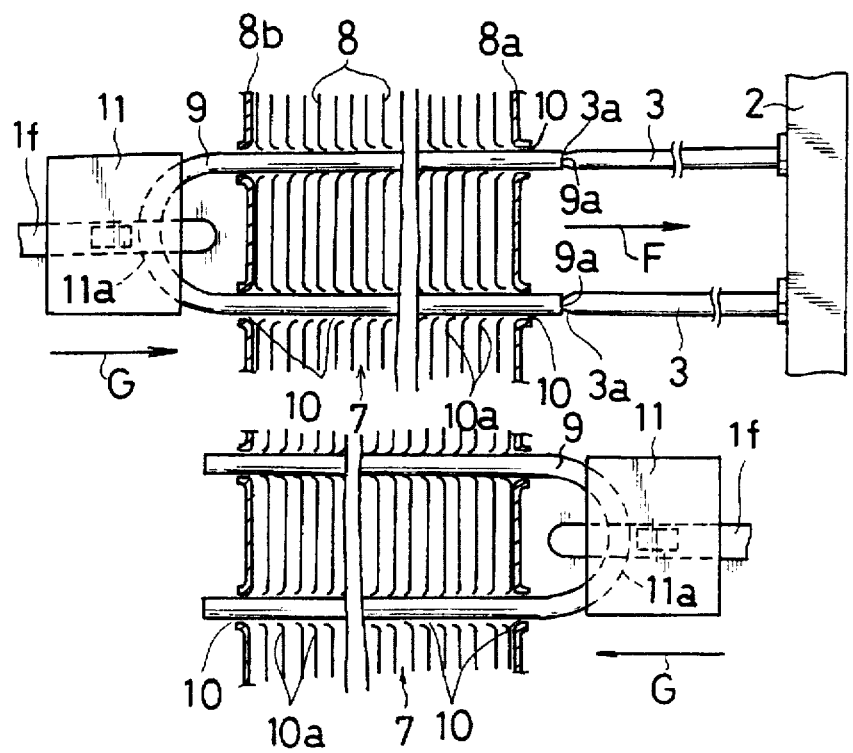

Referring to FIG. 4B, the rod members 3 are inserted into some of the through holes 10 of the radiation fin 8a. The rod members 3 then extend through the associated through holes 10 to align the same, and moved back and removed from the through holes 10. This is the same manner as in the above embodiments. However, the hairpin tubes 9 are simultaneously positioned at both ends of the heat exchanger body 7 by arranging the hairpin tube transporting members 11 at both sides of the heat exchanger in this embodiment. That is, the hairpin tubes 9 positioned at the opposite end of the heat exchanger body 7 are inserted into the through holes 10, into which the rod members 3 were previously inserted, and the hairpin tubes 9 positioned at the one end of the heat exchanger body 7 are inserted into the remaining through holes 10. Thus, the hairpin tubes 9 are inserted from both ends of the heat exchanger body 7. It is a matter of course that the location of the hairpin tube transporting member 11 is not necessarily positioned to be closer to the one end or the opposite end of the heat exchanger body 7. Further, the hairpin tube transporting member 11 is not necessarily moved synchronously with the backward movement of the rod members 3.

Figure 5:
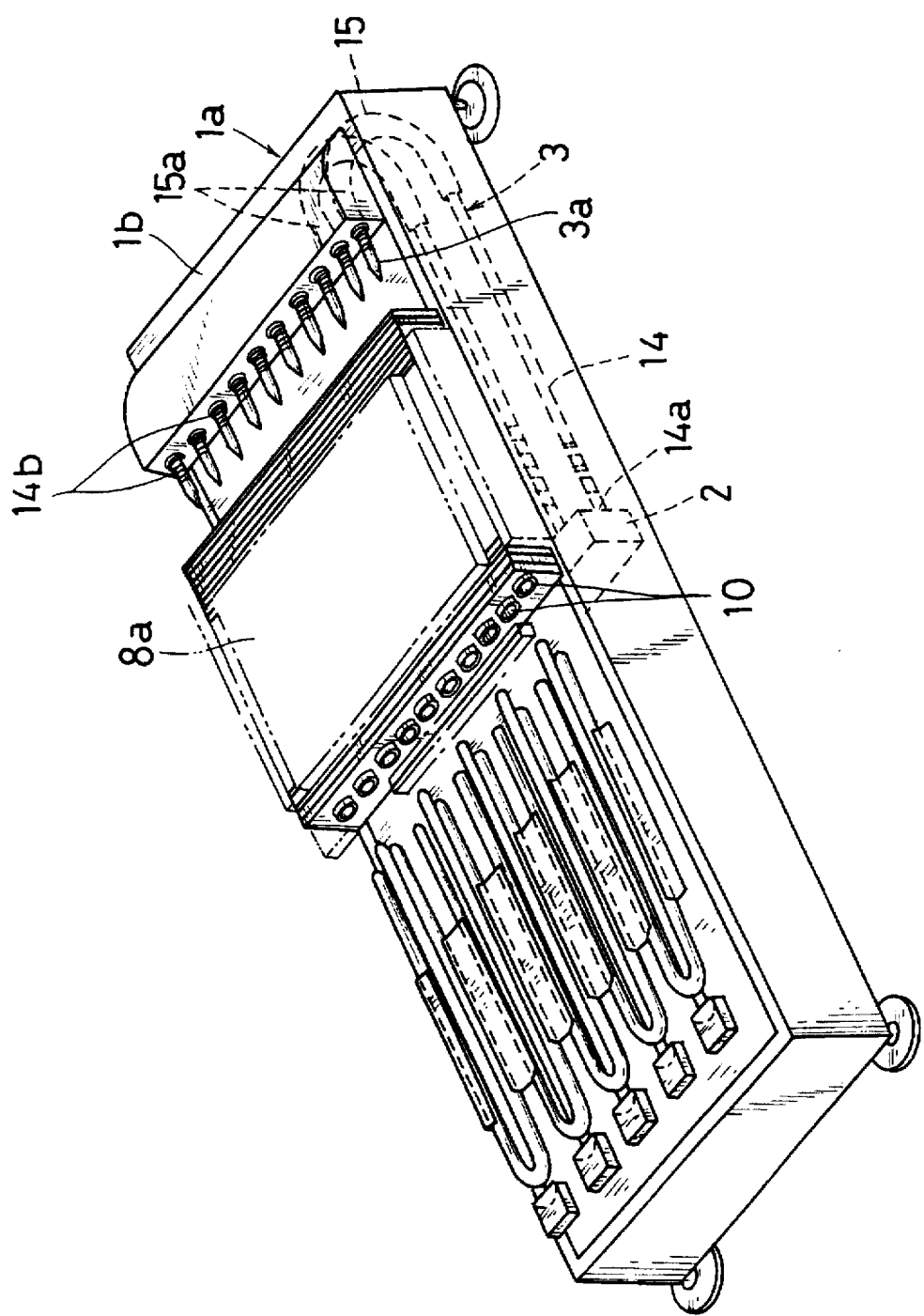
FIG. 5 is a perspective view illustrating the apparatus of the present invention in accordance with a further embodiment of the present invention.
Figure 6:
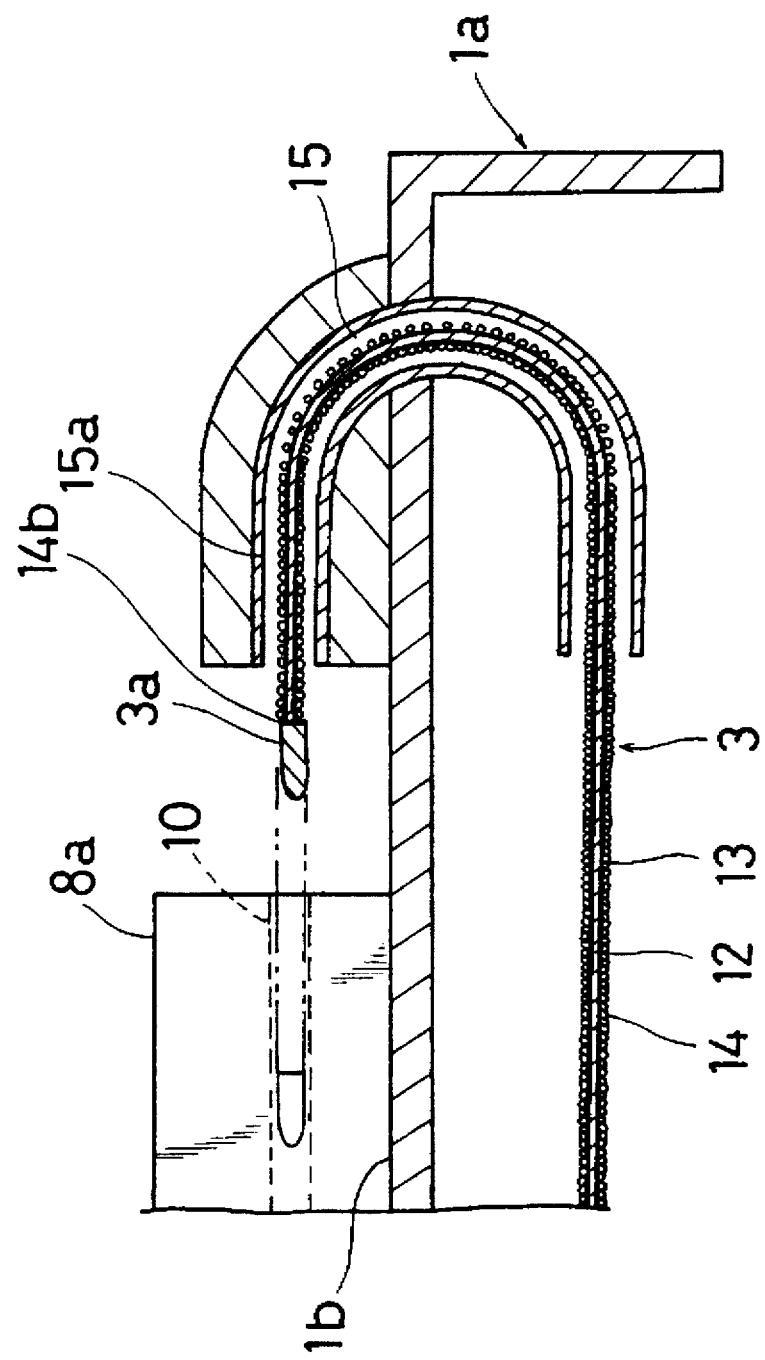
FIG. 6 is an enlarged cross sectional view of the apparatus of FIG. 5.

In the above embodiments, the rod members 3, each having the pointed tip end 3a, are mounted on the reciprocating member 2. However, it is not necessary that the rod member 3 has a rigid body portion. Instead, the rod member 3 may be formed of, for example, a flexible shaft 14 which includes a wire 12, around which a belt-like spring material is wound, as illustrated in FIGS. 5 and 6. The flexible shaft 14 of this construction usually keeps its straight profile, but is flexibly bent, once an outside non-axial force is applied thereto.

The rod member 3 of this construction is fixed at its one end 14a to the reciprocating member 2 which is arranged inside of the hairpin tube inserting apparatus body 1a. The rod member 3 is provided at its opposite end 14b with the pointed tip end 3a. A plurality of rod members 3 thus formed are respectively inserted into substantially U-shaped guiding members 15. The tip ends 3a protrude away from the guiding member 15 above an upper surface of the apparatus body 1a. In this arrangement, each rod member 3 is bent along an innser surface of the guiding member 15 as it is advanced, but corrected and aligned into a straight profile via a straight portion 15a of the guiding member, and is then inserted into the through holes 10 of the radiation fins 8a via the tip end 3a.

Thus, the rod member 3 can be positioned inside of the apparatus body 1a by employing a flexible shaft 14 for the rod member 3. Accordingly, the longitudinal length of the apparatus body may be reduced, which contributes to space-saving for manufacturing place.

Figure 7A:
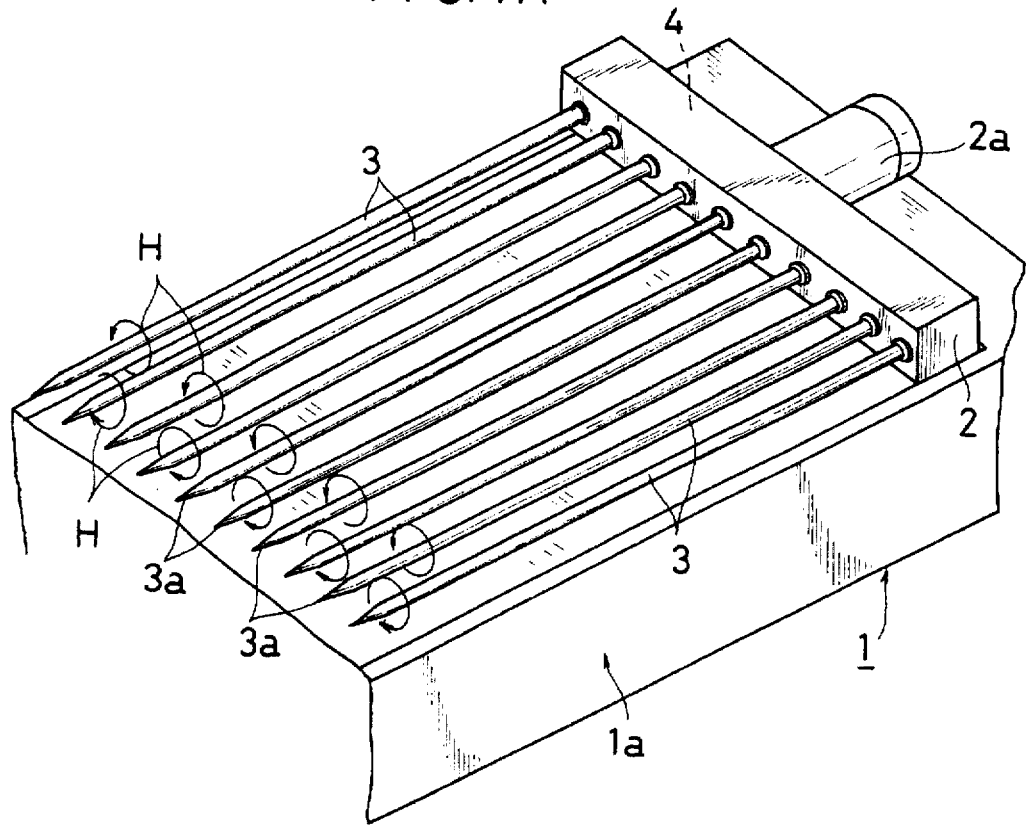
FIGS. 7A and 7B are perspective views illustrating operational steps of the apparatus in accordance with a still further embodiment of the method of the present invention.
Figure 7B:
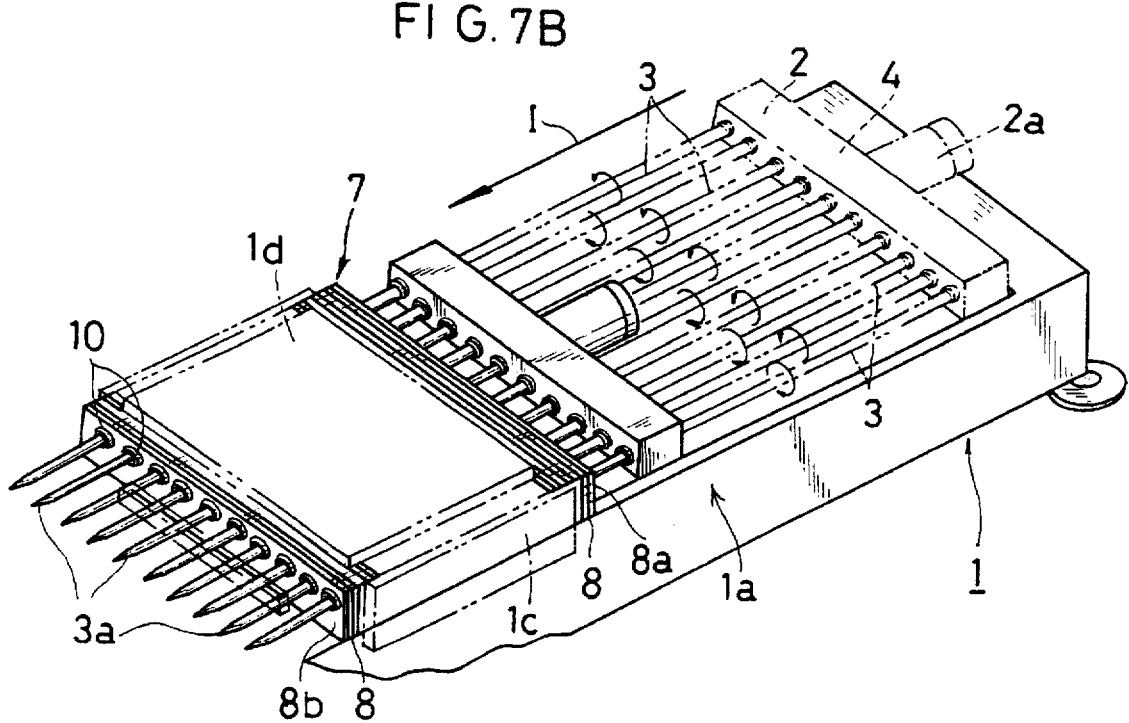

FIGS. 7A and 7B illustrate a still further embodiment of the rod member 3. The rod members 3 are rotatably mounted on the reciprocating member 2 via a rotating mechanism 4 which is mounted inside of the reciprocating member and driven by a motor 2a. In this manner, each rod member 3 is rotated in a reverse direction opposite the direction of rotation of its adjacent rod member 3, as indicated by arrows H, as the reciprocating member 2 is moved towards the heat exchanger body 7 in the direction of arrow I while the rod members 3 mounted thereon are inserted into the respective through holes 10, as illustrated in FIG. 7B. The undesirable force effected by the rotation of the rod member 3 to distort the stacked radiation fins 8 in shape can be omitted by rotating the rod members 3 in a different direction to that of the adjacent rod members 3. Thus, the rod members 3 are smoothly inserted into the through holes 10.

In this embodiment, however, it is possible to rotate all of the rod members 3 in the same direction, or to rotate some of the rod members 3 at random. Further, the rotational direction of the rod members 3 may be changed at one time in a predetermined period of time.

Figure 8A:
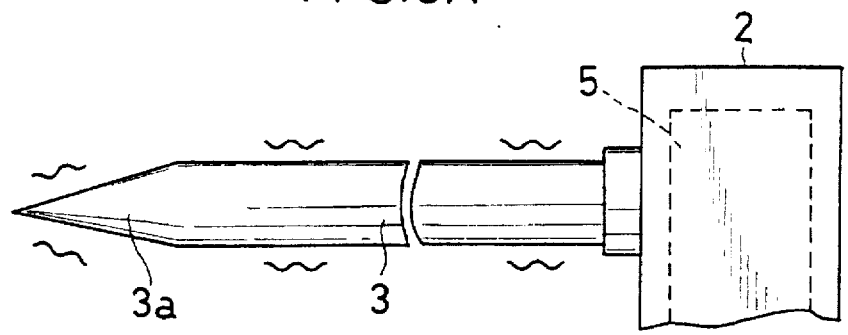
FIGS. 8A, 8B, 8C and 8D are side views illustrating a rod member in accordance with even further embodiments of the present invention.
Figure 8B:
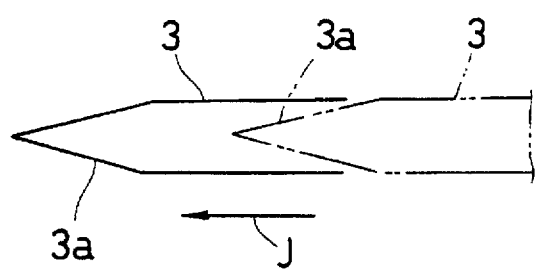
Figure 8C:
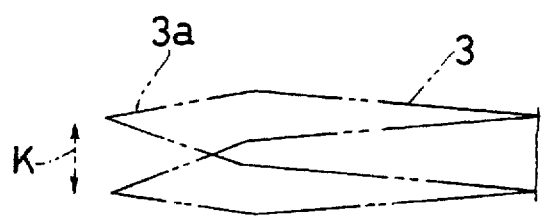
Figure 8D:
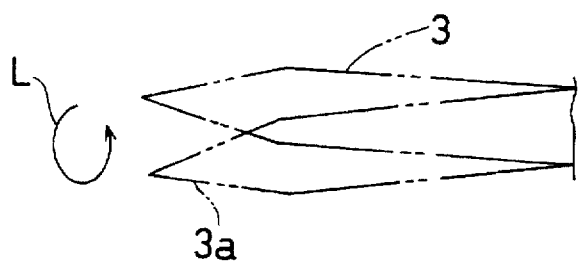

The rod member 3 may be moved in various manners to be smoothly inserted into the through holes 10. In FIG. 8A, the rod member 3 is vibrated via a vibrating mechanism 4 mounted on the reciprocating member 2. In FIG. 8B, the reciprocating member 2 is moved such that the rod members mounted thereto are intermittently moved forward or pulsed in the direction of arrow J. In FIG. 8C, the rod member is moved laterally in the direction of arrow K which is the transverse direction to the axial direction of the rod member 3, as it is moved forward. In FIG. 8D, the rod member 3 is moved circularly at its tip end 3a as indicated by arrow L. By moving the rod member 3 in these manners, the tip end 3a of the rod member 3 can be easily inserted into the through holes 10, and thus the associated through holes 10 of the stacked radiation fins 8 can be easily aligned with each other.

In the above embodiments, the pointed tip end 3a is employed to enable the rod member 3 to be easily inserted into the through holes 10, and to be subsequently inserted into the hairpin tube 9 via the open end 9a which is positioned outside of the heat exchanger body 7, while abutting against the periphery of the open end 9a. However, a hemispherical or angular configuration may be employed for the tip end 3a. That is, it is not necessary to limit the configuration, or dimension of the tip end 3 to the above embodiments. Further, it is not necessary to limit the number, the length and the outer diameter of the rod member 3 to the above embodiments, provided that the tip end 3a of the rod member 3 can abut against the open end 9a of the hairpin tube 9.

Figure 9:
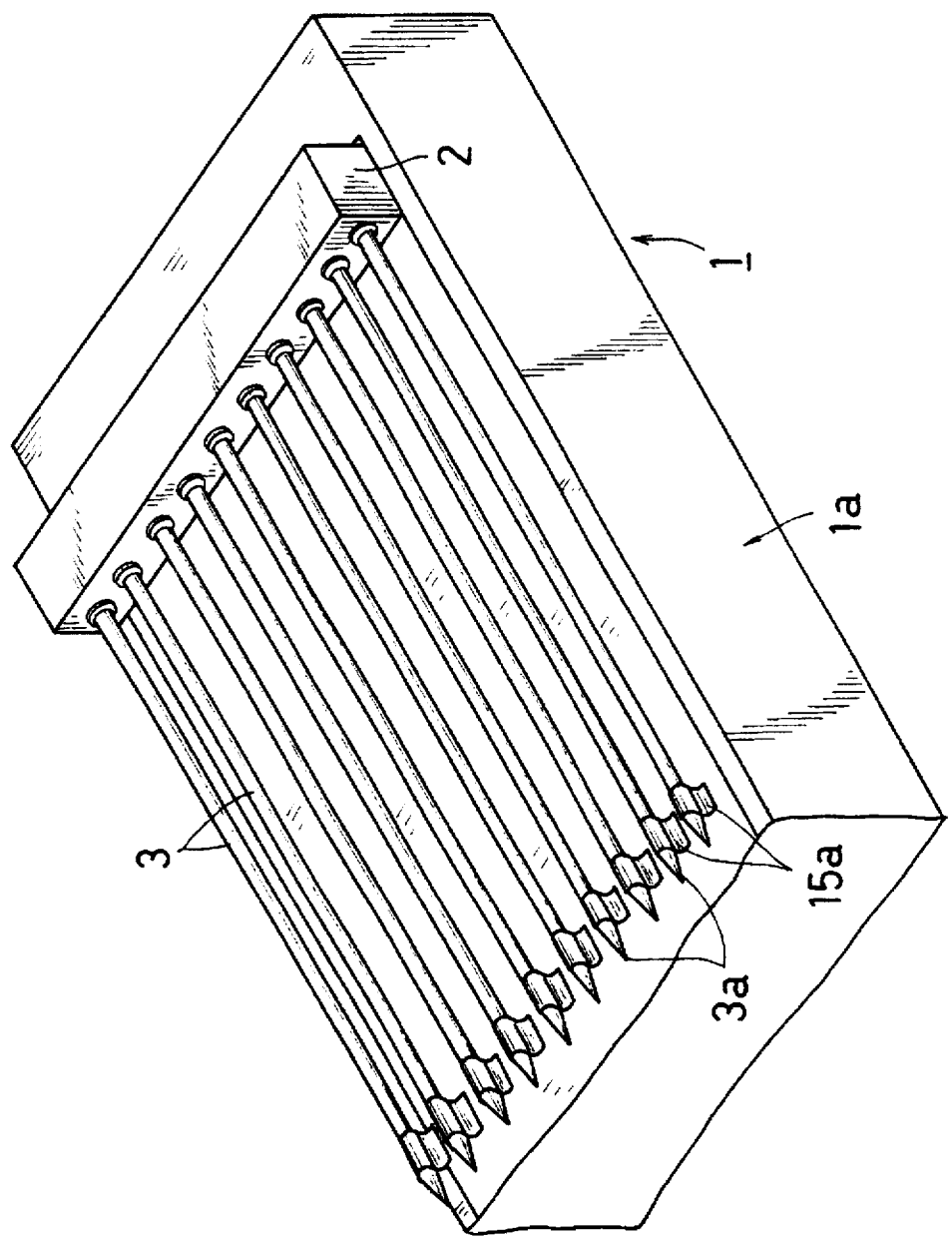
FIG. 9 is a perspective view with part broken away, of a guiding member of the rod member in accordance with yet another embodiment of the present invention.
Figure 10:
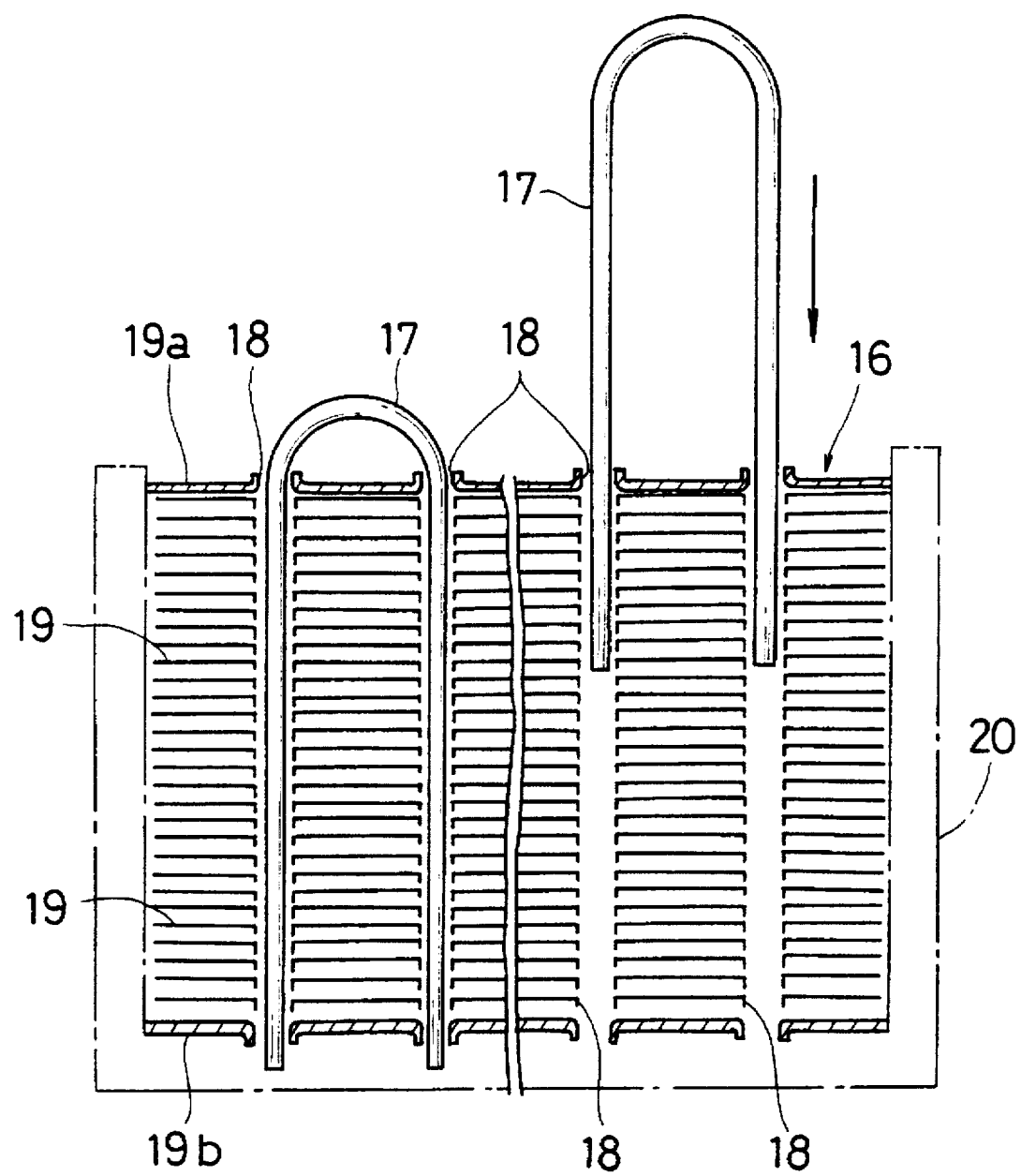
FIG. 10 is a front view with part broken away, illustrating an operational step for inserting a hairpin tube in accordance with a conventional manner.

Further, the rod member 3 may be supported at a portion closer to the tip end 3a by a supporting member 15a to securely reciprocate the rod member 3, as illustrated in FIG. 9. With this arrangement, it is unlikely that the rod member 3 is undesirably bent when it is inserted into the through holes 10. Thereby, the rod member 3 can be more smoothly inserted into the through holes 10.

In the above embodiments, the reciprocating member 2 and the hairpin tube transporting member 11 can be activated by known means such as an electric motor. It is not necessary to limit a type, construction, mechanical structure and the like of the driving means for the reciprocating member 2 and the hairpin tube transporting member 11 to the above embodiments, provided that both members 2 and 11 can be reciprocated relative to each other.

Further, the apparatus of the present invention can be employed for the heat exchanger body 7 which has an end plate positioned at both ends or on either end of the heat exchanger body, with the end plate being adjacent to the outermost radiation fin 8. In this regard, one radiation fin 8 may function as the end plate, and the same construction of the radiation fin 8 as the stacked radiation fin 8 can be used for the end plate. Otherwise, the end plate has a different construction from the radiation fin, provided that it has through holes defined in the same manner and places as in the radiation fins, and those through holes can be aligned with those of the radiation fins via the rod member 3 as in the above embodiments.

This specification is by no means intended to restrict the present invention to the preferred embodiments set forth therein. Various modifications to the hairpin tube inserting apparatus and method of the present invention, as described herein, may be made by those skilled in the art without departing from the spirit and scope of the present invention as defined in the appended claims.

What is claimed is:

1. An apparatus for mounting a hairpin tube to a heat exchanger body, which comprises:

a base;

a reciprocating member movable forward and backward longitudinally of said base;

a rod member mounted on said reciprocating member and insertable into through holes defined in each of plural radiation fins stacked in the heat exchanger body from the through hole of the radiation fin closer to one end of the heat exchanger body to the radiation fin closer to the opposite end of the heat exchanger body;

a hairpin tube transporting member for transporting the hairpin tube such that an open end of the hairpin tube is inserted into the through hole of the radiation fin closer to the opposite end of the heat exchanger body; and means for imparting motion to said rod member for smoothly inserting said rod member into said through holes wherein said motion is independent of the motion of said reciprocating member.

2. An apparatus for mounting a hairpin tube to a heat exchanger body, which comprises:

a base;

a reciprocating member movable forward and backward longitudinally of said base;

rod members mounted on said reciprocating member such that each said rod member is inserted into at least one of plural through holes defined in each of plural radiation fins stacked in the heat exchanger body from the through holes of the radiation fin closer to one end of the heat exchanger body to the radiation fin closer to the opposite end of said heat exchanger body, and each said rod member being positioned to correspond to at least one of the through holes;

a hairpin tube transporting member for transporting the hairpin tube such that an open end of the hairpin tube is inserted into the through holes from at least one of the ends of the heat exchanger body, wherein the hairpin tube to be inserted from the one end of the heat exchanger body is inserted into through holes of said radiation fins other than the through holes into which said rod members are inserted; and means for imparting motion to said rod members for smoothly inserting said rod members into said through holes wherein said motion is independent of the motion of said reciprocating member.

3. An apparatus for mounting a hairpin tube to a heat exchanger body, which comprises:

a base;

a reciprocating member movable forward and backward longitudinally of said base;

rod members mounted on said reciprocating member such that each rod member is inserted into through holes defined in each of plural radiation fins stacked in the heat exchanger body from the through holes of the radiation fin closer to at least one end of the heat exchanger body;

a hairpin tube transporting member for transporting the hairpin tube such that an open end of said hairpin tube positioned to face through hole of the radiation fin closer to the opposite end of the heat exchanger body abuts against a tip end of said rod member protruded from the through hole via the forward movement of said reciprocating member, said hairpin tube transporting member moving said hairpin tube synchronously with the movement of said reciprocating member to insert said hairpin tube into the through hole of the radiation fin closer to the opposite end of the heat exchanger body while maintaining an abutment between the open end of the hairpin tube and said tip end of said rod member, when said reciprocating member is moved backward away from the heat exchanger body; and means for imparting motion to said rod members for smoothly inserting said rod members into said through holes wherein said motion is independent of the motion of said reciprocating member.

4. An apparatus according to any one of claims 1 to 3 wherein said means for imparting motion comprises a rotating mechanism for rotating each rod member about a longitudinal axis thereof.

5. An apparatus according to claim 2 or 3, wherein said means for imparting motion comprises a rotating means on said reciprocating member for rotating each of said rod members in an opposite direction to that of an adjacent rod member.

6. An apparatus according to any one of claims 2 or 3, wherein said means for imparting motion comprises a vibrating mechanism for vibrating each rod member.

7. An apparatus according to any one of claims 2 or 3, wherein said means for imparting motion comprises a mechanism for pulsing each rod member forward and backward at a predetermined pitch as said rod member is inserted into said heat exchanger body.

8. An apparatus according to any one of claims 1 to 3, wherein a whole portion or a tip end of said rod member is swingable.

9. An apparatus according to any one of claims 1 to 3, wherein a tip end of said rod member is tapered to a point.

10. An apparatus according to any one of claims 1 to 3, further comprising a guiding member positioned to face the through hole of the radiation fin closer to the one end of the heat exchanger body guiding said rod member mounted to said reciprocating member in a straight line as said rod member is inserted into said through hole.

11. An apparatus according to any one of claims 1 to 3, wherein each rod member is entirely or partly bendable.

12. An apparatus according to claim 11, wherein said reciprocating member is positioned inside of said apparatus, and said apparatus further comprises a substantially U-shaped guiding member having a straight portion positioned to face the through hole of the radiation fin closer to the one end of the heat exchanger body for guiding and forcing said rod member to be a straight form as said reciprocating member moves forward.

\* \* \* \* \*